A. M. DONALD.
ADJUSTABLE WEED HOOK FOR PLOWS AND CULTIVATORS.
APPLICATION FILED APR. 14, 1910. RENEWED JULY 11, 1911.
1,015,756.
Patented Jan. 23, 1912.
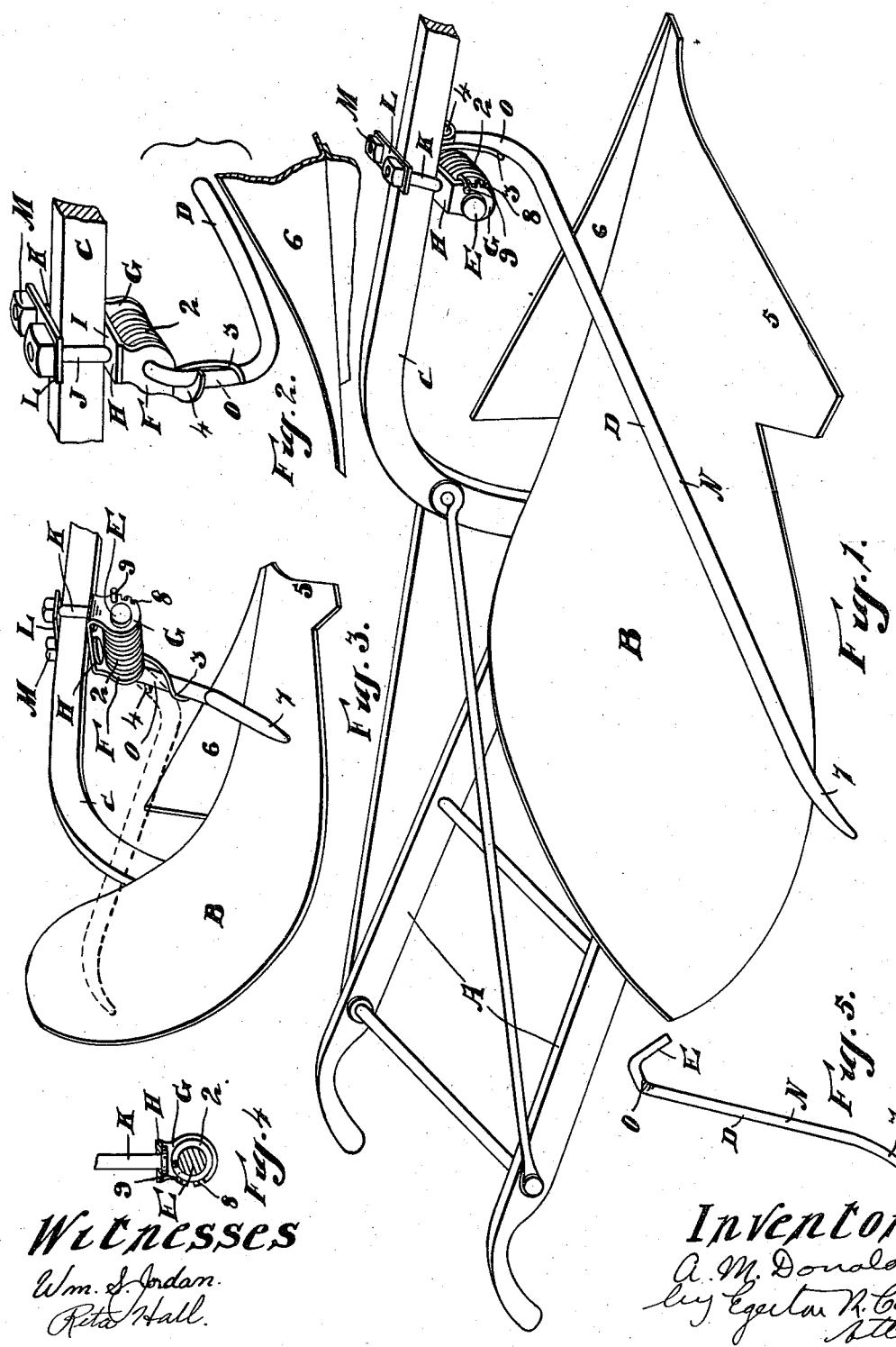

UNITED STATES PATENT OFFICE.

ALEXANDER M. DONALD, OF OBERON, MANITOBA, CANADA.

ADJUSTABLE WEED-HOOK FOR PLOWS AND CULTIVATORS.

1,015,756.  Specification of Letters Patent.  Patented Jan. 23, 1912.

Application filed April 14, 1910, Serial No. 555,445. Renewed July 11, 1911. Serial No. 638,020.

*To all whom it may concern:*

Be it known that I, ALEXANDER M. DONALD, a subject of the King of Great Britain, residing in the town of Oberon, Province of Manitoba, Canada, have invented certain new and useful Improvements in Adjustable Weed-Hooks for Plows and Cultivators, of which the following is a specification.

My invention relates to improvements in adjustable weed hooks for plows and cultivators, and one of the objects of my invention is to provide a device of the class described with means whereby the tension of the spring controlling the same may be regulated so that the device will be equally efficient for light and heavy work.

Another object of my invention is to mount my device on the cultivator or plow in such a position in relation to the mold board, that the movement of the device will be substantially in a plane parallel to the front surface of the mold board, and the construction of my invention will be hereinafter more particularly described, and the parts I claim as new will be pointed out in the claims forming part of this specification.

Figure 1 is a perspective view of the major portion of a plow, showing in perspective a front view of my weed hook attached thereto. Fig. 2 is a perspective view of portion of the land side of the colter, and part of the plow beam, also a perspective view of the landward side of my weed hook. Fig. 3 is a perspective view of the mold board and connected parts, and portion of the plow beam, showing a perspective view of my weed hook at a different angle to that illustrated in Fig. 1. Fig. 4 is a vertical cross-section through the upper portion of the weed hook, and the bracket supporting the same, and Fig. 5 is a plan view of my weed hook on a reduced scale.

In the drawings, like characters of reference indicate corresponding parts in each figure.

A are the usual handles of the plow, suitably braced, and B the mold board.

C is the plow beam.

D is my weed hook, which is mounted by means of its head E in the ears F and G of the bracket H which is positioned against the underside of the plow beam C. The bracket H may be clamped to the plow beam C after any suitable construction. My preferred construction for this purpose consists in passing through the top plate I of the bracket H, bolts J and K, one on each side of the plow beam. The bolts J and K pass through holes formed in the plate L which rests on top of the plow beam C, and as each bolt is provided with a nut M, it will be understood that the bracket H will be clamped firmly in place. By slackening the nuts M, it will be understood that the bracket H and parts carried thereby, can be adjusted on the beam C. The arm N of the weed hook D, is positioned below the head E, and is connected with said head by the extension O.

2 is a coiled spring positioned around the head E and between the ears F and G. The free end 3 of this spring 2 is positioned so as to rest against the extension O of the weed hook. The spring 2 is of course under tension, and it will be understood that the end 3 thereof is held under tension against the weed hook, thus keeping the extension O thereof normally against the hook 4 which is preferably integrally formed a part of the ear F. As the plow share 5 and colter 6 sever the bottom and sides of the furrow, the furrow slides over the mold board B and is of course turned over by the same. Now the arm N of the weed hook will come in contact with the weeds, manure, small stones and anything else that may be on the top of the furrow, and same will position the same so as to positively insure the furrow covering the same up.

As before stated, the arm N is mounted so that it will move in a plane more or less parallel to the front side of the mold board B and therefore the said arm will at all times occupy the most efficient position to insure the weeds and other material resting on the top of the furrow being turned underneath the same. In Fig. 3 the arm N is shown in dotted position which position is substantially the limit of its upward movement. The tension of the spring 2 exerted by its end 3 against the weed hook will insure the arm N being held with the necessary tension against the material to be turned underneath the furrow. Should the said material offer an undue resistance of the arm N, then this arm will yield and so prevent breakage. But, as before stated, the movement of the arm N is such as to insure the same occupying at all times the most efficient position in respect of the mold board B. The free end 7 of the arm N is preferably bent at an outward-backward-inward angle so that the material, particularly the weeds, at the edge of the furrow will be turned thereunder.

At certains seasons of the year the weeds are light and tender, but as the season advances and the weeds mature, they become stiff and hard, and therefore it requires more force exerted against them by the weed hook in order to successfully insure the covering up of the same by the furrow. I therefore construct my device so that the tension of the spring 2 exerted against the weed hook, can be adjusted so as to fit the weed hook for light and heavy work.

8 are a series of notches formed in one edge of the ear G, and the end 9 of the spring 2 is held in one of these notches. In the position shown of the end 9, the spring 2 is adjusted to exert its maximum power against the weed hook. Without further explanation it will be understood how the tension of the spring 2 is regulated in order to get the desired pressure against the said weed hook.

In devices of this class, it is essential that the weed hook at all times occupy the most efficient position in respect of the furrow, and by mounting this weed hook so that its path of movement will be as before described, the best results are obtained from its use.

Although I have illustrated my invention as mounted for use in connection with a plow, it will of course be understood it is designed to be used with cultivators as well.

I do not confine myself to the construction herein shown and described, except in so far as that may be rendered necessary by the prior state of the art and the terms of my claim.

Upon referring to Figs. 1 and 5, particularly Fig. 1, it will be seen that the arm N is positioned so that it slopes backward in respect to the mold board B. No matter how the said arm may be mounted, this positioning of the same is essential, because the said arm at all times will occupy a position most efficient in relation to the mold board B. When mounting the said arm in the bracket H, after the construction illustrated, the head E must of necessity occupy an angular position in relation to the arm N, in order to allow for the proper positioning of the said arm.

In this specification and claims the terms the "backward-downward" and "forward-upward" are used to mean that the various parts of the arm N occupy the positions mentioned in respect of the outer face or surface of the mold board B.

From the drawings, particularly Figs. 2 and 3, it will be noticed that the extension O extends at a downward-backward angle in respect of the head E, or in other words, at an upward-outward angle in respect of the arm N, and that it is positioned above the landward side of the mold board so that the head E will be mounted in its bearings in such a position that the arm N will move in the plane before described. The arm N is straight, and it always occupies an upward-backward-outward position in respect of the mold board. In various makes of weed hooks, it is impossible by means of the same, to as effectually turn in the weeds close to the colter as well as those toward the outer edge of the mold board, from the very fact that that portion of the weed hook that actually comes in contact with the weeds, does not move in a plane substantially parallel to the outer surface of the mold board. Now since my weed hook does move in such a plane, it naturally follows that it at all times occupies a position the most efficient in relation to the mold board. The construction described respecting the extension O and head E or its equivalent, places the pivotal point of the arm N in the position shown.

What I claim as my invention is.

1. In an agricultural implement, of the class described, the combination with the mold board thereof, and the beam, of a weed hook comprising a straight arm positioned to occupy a backward-downward-outward angle in respect of said mold board, so that it will move in a plane substantially parallel to the outer surface of the mold board so as to insure the weeds for the whole width of the furrow, being covered by the same; a horizontally disposed head for said arm which extends at an angle in advance thereof and above the same and with which arm it is connected by a backward-downward extension, means whereby said head is journaled to occupy a position transversely to said beam so that the arm will have the described movement from a point positioned above the landward side of said mold board; a coiled spring mounted on said head, the landward side of said spring extending downward and resting in contact with the said extension, and a stop carried by said beam against which the said extension is normally spring held.

2. In an agricultural implement of the class described, the combination with the mold board thereof, and the beam, of a weed hook comprising a straight arm positioned to occupy a backward-downward-outward angle in respect of said mold board, so that it will move in a plane substantially parallel to the outer surface of the mold board so as to insure the weeds for the whole width of the furrow, being covered by the same; a horizontally disposed head, for said arm, which extends at an angle in advance thereof and above the same and with which arm it is connected by a backward-downward extension, a bracket adjustably carried by said beam and disposed transversely thereof; a depending ear carried by each end of the said bracket; the said head being journaled in said ears so that, together with the construction of said arm, the same will have the described movement from a point positioned above the landward side of said mold board; a coiled spring mounted on said head and between said ears, the landward end of said spring extending downward, and resting in contact with the extension of said arm, and a hook integrally formed with the one of said ears positioned above the landward side of said mold board and having the side, facing said mold board, open, the extension of said arm being normally spring held against said stop.

In testimony whereof I have affixed my signature in presence of two witnesses.

ALEXANDER M. DONALD.

Witnesses:
 MORGAN MAY,
 J. W. NEWTON.

---

Copies of this patent may be obtained for five cents each, by addressing the "Commissioner of Patents, Washington, D. C."